United States Patent [19]

Clifford et al.

[11] 4,004,523
[45] Jan. 25, 1977

[54] SOLID PROPELLANT CHARGES

[76] Inventors: David Victor Clifford; Stephen William Bell, both c/o The Ministry of Aviation, London; Stuart Gordon, 10 Furlongs Road, Cleobury Mortimer, Shropshire; Philip Graham Jones, 5 Rozel Avenue, Broadwater, Kidderminster, Worcestershire, all of England

[22] Filed: Oct. 26, 1966

[21] Appl. No.: 591,036

[30] Foreign Application Priority Data

Oct. 27, 1965 United Kingdom ............ 45505/65

[52] U.S. Cl. ............................................ 102/103
[51] Int. Cl.² ....................................... C06B 45/28
[58] Field of Search ............. 102/103; 60/35.6 RS; 86/1; 264/3

[56] References Cited

UNITED STATES PATENTS

| 3,012,507 | 12/1961 | Mosher et al. ................... 102/103 |
| 3,032,437 | 5/1962 | Pitchford ....................... 102/103 X |
| 3,157,127 | 11/1964 | Proell ............................... 102/103 |
| 3,202,730 | 8/1965 | Gordon et al. ....................... 264/3 |
| 3,263,613 | 7/1966 | Rice et al. ......................... 102/103 |

Primary Examiner—Verlin R. Pendegrass
Attorney, Agent, or Firm—Cushman, Darby & Cushman

[57] ABSTRACT

A solid propellant charge having combustion inhibited surfaces provided by bonding elastomeric combustion-inhibiting material to the surfaces by a layer of a polyvinyl acetal resin bonded directly to those surfaces, and by a layer of another resin selected from epoxy resins, polyesters and formaldehyde resins.

5 Claims, 1 Drawing Figure

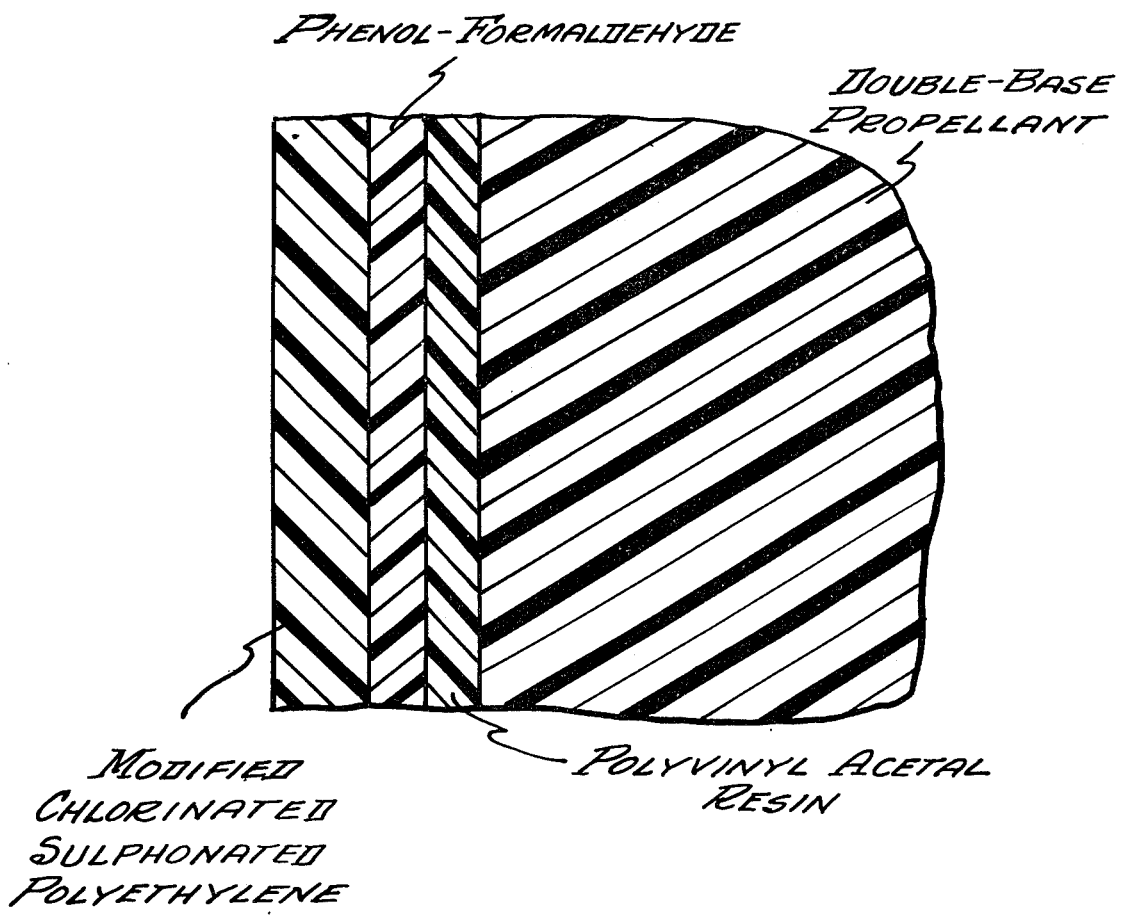

SOLID PROPELLANT CHARGES

This invention relates to solid propellant charges for use in rocket motors and methods for their manufacture.

Such charges commonly comprise a solid mass of double-base propellant, i.e. a propellant formed from a mixture of nitrocellulose and nitroglycerine, or other liquid nitric esters, with or without other additives, such as oxidisers, organic binders and fuels. The charge is usually made in cylindrical form to facilitate its loading, cartridge-fashion, into a rocket motor case and may be provided with one or more longitudinal, internal cavities, a combustion inhibiting material being bonded to the outer surfaces of the charge to prevent burning at those surfaces. When an internal cavity is provided, the charge may be made to burn outwards from the inner surface of the cavity or, when no cavity is provided, to burn cigarette-wise from one end face of the charge, which is left uninhibited. Such doublebase propellant charges are hereinafter referred to as "combustion inhibited solid propellant charges".

Hitherto, cellulose derivatives, such as cellulose acetate and ethyl cellulose have been extensively used as combustion inhibiting materials, since they are fully compatible with double-base propellant, highly endothermic, non-combustible in the propellant gases, permeable to the propellant decomposition products and readily conformable to the surfaces to which they must be bonded. Furthermore, because of the solubility of cellulose acetate in nitroglycerine it may be readily bonded to the charge without using any additional adhesive; this had led to its widespread adoption as an inhibitor.

However, the mutual solubility of nitrocellulose and cellulose acetate in nitroglycerine and liquid nitric esters which is the basis of this inhibitor/propellant bond has a marked deleterious effect on the inhibited charge, on storage, by reason of the steady migration of nitroglycerine into the inhibitor, which may proceed until the inhibitor itself becomes combustible. This migration is accelerated by rise of storage temperature, so that, unless the charges or rockets containing them are stored under carefully controlled conditions, the inhibiting material can quickly become ineffective. In parallel with this charge, plasticisers from the inhibiting material will tend to migrate into the outer region of the charge, rendering it less combustible.

The combined effect of these migrations is to blur the sharpness of the combustion cut-off when the inhibiting material is reached. Since most rocket motors are designed to have carefully controlled combustion characteristics, this may cause serious malfunctioning of the rocket on firing.

Ethyl cellulose suffers from the same disadvantage, but to a lesser degree. However, ethyl cellulose even when coated with a thin layer of cellulose acetate, does not provide a very satisfactory bond with many propellants.

It is an object of the present invention to provide a combustion inhibited solid propellant charge which possesses improved storage characteristics compared with those hitherto available.

According to one aspect of the invention, a combustion inhibited solid propellant charge has an elastomeric combustion inhibiting material bonded to those surfaces of the charge at which combustion is to be inhibited, a bonding material between the charge and the inhibiting material comprising a layer of a polyvinyl acetal which is bonded directly to the propellant.

According to another aspect of the invention, a method of forming a combustion inhibited solid propellant charge comprises forming a bond between an elastomeric combustion inhibiting material and those surfaces of the charge at which combustion is to be inhibited, the bond being formed by means of a bonding material comprising a layer of a polyvinyl acetal which is bonded directly to the propellant.

Polyvinyl formal has been found to be especially suitable.

Preferably in the charge or the method of forming the charge according to the invention, a layer of another resin is provided between the polyvinyl acetal layer and the inhibiting material, the other resin being chosen for its compatibility with both the polyvinyl acetal and the inhibiting material. Examples of suitable resins incude epoxy, polyester and formaldehyde resins; but phenol-formaldehyde resin is particularly suitable when the acetal consists of polyvinyl formal. Alternatively, this resin may itself constitute the elastomeric combustion inhibited material.

The term "elastomeric combustion inhibiting material", as used in this specification, denotes an elastomer possessing the following properties:
1. Compatibility with double-base propellant, the constructional materials of the rocket motor case being chosen to be compatible with the elastomeric combustion inhibiting material.
2. Low solubility in nitroglycerine and other liquid nitric esters and vice versa.
3. Non-combustible in and resistant to erosion by the propellant combustion gases.
4. Endothermic.
5. Possessing thermal capacity, conductivity and expansion of the same order as those of the propellant.
6. Permeable to propellant decomposition gases which are evolved during storage.
7. Capable of being bonded to the propellant.
8. Readily formable.
9. Elastomeric to adapt to physical and mechanical behaviour of the propellant.

Suitable elastomeric materials for the inhibiting material include modified chlorinated sulphonated polyethylene, such as the "Hypalon" (Trade Mark) rubbers manufactured by E.I. du Pont de Nemours & Co., and modified ethylene propylene terpolymers, such as the "Royalene" (Trade Mark) rubbers manufactured by the U.S. Rubber Co.

Other suitable materials include castable epoxides, such as the "Epophen" (Trade Mark) resins manufactured by Leicester, Lovell & Co., and castable polyurethane rubbers.

All these materials are compatible with double-base propellants and have satisfactory insulation properties. They are able to follow the expansion and contraction of propellants over a wide temperature range, partly because of their high extensibility and partly because of a coefficient of thermal expansion similar to the propellant.

The sole figure in the drawing illustrates the above-identified sequence of propellant, polyvinyl acetal resin, the "other" resin and the combustion-inhibiting material. In the illustrated embodiment the "other" resin may be considered to be phenol-formaldehyde, and the combination inhibiting material may be considered to be a modified chlorinated sulphonated polyethylene.

Erosion resistance may be provided by filling with flame retarding materials, such as silica or antimony oxide; and, particularly in the case of the "Hypalon" rubbers, by enhancing the degree of cross-linking in the polymer by vulcanising with sulphur containing compounds. All types are sufficiently permeable to propellant decomposition gases to prevent their slow evolution during storage from causing the inhibiting material to form blisters and hence cause local rupturing of the propellant/inhibitor bond. They also possess a low affinity for nitroglycerine, e.g. "Hypalon" will only absorb 3–5% of its own weight of nitroglycerine compared with >100% for cellulose acetate.

Either of the generally used processes for applying inhibiting materials to propellant charges may be conveniently applied to the invention, i.e. by first forming the charge and then applying the inhibiting material to its surface, or by preforming a sheath of inhibitor to the required shape, and casting the propellant into the sheath.

In the first process, the inhibiting material may be applied to the preformed charge by wrapping it on in the form of tape or sheet or by dip or spray coating the charge with a solution of elastomer in a suitable solvent, or by casting or trowelling of a prepolymer around the charge followed by an appropriate cure schedule.

In the second process, an inhibiting material may be preformed by means of moulding, vacuum forming, extrusion, or other suitable plastics forming methods then filled with propellant by a casting or pouring technique.

In the first process, the polyvinyl acetal may be applied to the performed charge as a solvent lacquer which is permitted to dry before the application of the inhibiting material or prepolymer which forms the inhibiting material. Alternatively, the bonding material may be applied to the inhibiting material before it is bonded to the propellant, preferably in the form of a double resin, or duplex, layer, comprising layers of phenol-formaldehyde and polyvinyl acetal, the phenol-formaldehyde layer being applied to the inhibitor. The acetal is preferably polyvinyl formal.

Typical alternative methods of forming composite layers of inhibiting and bonding materials are:
1. Inhibitors for Preformed Propellant
   i. Wrapped Elastomers This entails the prior manufacture of the inhibiting material in the form of sheet, tape or tube, coated with the adhesive preparations described in 2. In a preferred method, unvulcanised "Hypalon" sheet inhibiting material is successively lacquered on both sides with phenol-formaldehyde then polyvinyl acetal solutions respectively as bonding materials. After drying, the sheet is cured by the action of heat and pressure. Strips cut from this sheet are in a form suitable for bonding to propellant previously coated with a polyvinyl acetal lacquer. BOnding is effected by moistening the mating surfaces with a suitable solvent and maintaining pressure whilst the solvent disperses.

ii. Cast Prepolymers

A preformed propellant charge coated with a film of polyvinyl acetal is again the starting point for this method. The charge is located in a suitable mould and the mixed prepolymer inhibiting material cast into an annular space between charge and mould surface. Epoxides are preferred for this operation, but other materials, such as unsaturated peroxide cured polyesters or polyurethanes may be used alternatively.

2. Preformed Inhibitors for Cast Propellant
   i. Duplex Film System

A phenol-formaldehyde resin layer is laid down on a thin carrier foil, e.g. of polyethylene, and a polyvinyl acetal powder applied to it to form a foil-supported duplex film. When the resin layer has been consolidated by heating and passage between rollers, the carrier foil may be stripped off, exposing the duplex film of phenol-formaldehyde and polyvinyl acetal. The duplex film, which handles rather like tissue-paper, may be laid up on the surface of the inhibitor which is to be bonded to the charge, with the polyvinyl acetal layer outwards. The proportions of phenol-formaldehyde and polyvinyl acetal may conveniently be varied between 1/1 and ¼, although proportion outside this range may be used if occasion demands.

ii. Lacquer Coating System

This entails successively coating the surface of the inhibiting material which is to be bonded to the charge with two solutions, the first solution containing phenol-formaldehyde and the second containing polyvinyl acetal, the first coating being air-dried before applying the second. In a preferred method, the first solution contains both phenol-formaldehyde and acetal. The coating may be accomplished by spraying or dip coating, the viscosity of the solutions being adjusted to suit the particular method used. Dip coating is ideal if both sides of the inhibitor are to be coated.

iii. Powder Embedment System

The surface of the inhibiting material is coated with a phenol-formaldehyde solution and the tacky coated surface is then dusted with polyvinyl acetal powder. This virtually comprises forming a duplex film in situ, so that the difficulties associated with handling such a film are avoided.

When the inhibiting material has been laid up on the appropriate surfaces of the charge or when the propellant has been cast into a sheath of inhibiting material, the inhibited charge is preferably subjected to heat and pressure to cure the propellant and the bond between the inhibiting material and the propellant.

In a preferred process an elastomeric inhibitor is formed into a cup-like sheath by hand lay-up on a former or by moulding. The inner surface of the sheath is then coated with a duplex resin layer and the double-base propellant cast into the prepared sheath.

In order that the invention may be more fully understood, it will be illustrated by the following specific examples:

EXAMPLE 1

The inner surface of a 6 inch diameter steel tube was cleaned and lined with polypropylene foil as a parting agent, and a domed steel end-cap adapted to close one end of the tube was also cleaned.

Using the end-cap as a mould, a sheet of inhibiting material consisting of uncured "Hypalon" CL2759 chlorinated sulphonated polyethylene sheet, 0.05 inch thick, was vacuum formed to produce a domed disc; a similar disc of polypropylene foil was produced in the same mould. Holes of ⅝ inch diameter were punched in the centres of both discs. They were then degreased with trichlorethylene and allowed to air-dry for 30 minutes.

The inner and outer surfaces of the "Hypalon" disc were painted with methylated spirit and, while the surface was still wet, the polyethylene backing foil was stripped from a duplex resin film, prepared as hereinbefore described, and the film applied to the "Hypalon" disc to within ½ inch of its rim. The resin coated disc was allowed to air-dry for 24 hours at room temperature.

The domed polypropylene foil disc was fitted in the end-cap and the coated "Hypalon" disc fitted on top of the foil with its coated surface outwards.

A sheet of 0.05 inch thick uncured "Hypalon" having an area such that it would line the inner cylindrical surface of the steel tube, was degreased and coated with a duplex resin film as described above. The end-cap was then fitted to one end of the steel tube and the coated "Hypalon" lining sheet fitted inside the tube so that its lower curved edge overlapped the edge of the domed "Hypalon" disc, the outer surface of the overlapping edge of the sheet having been previously coated with "Redux" phenol-formaldehyde resin. The longitudinal edges of the lining sheet were also overlapped, the overlap strip being similarly coated with phenol-formaldehyde. In each case, the phenol-formaldehyde coating was trapped between two sheets of "Hypalon".

The inner surface of the "Hypalon" cup so formed was lined with a polypropylene foil parting agent and then the inner surface of the foil further lined with a sheet of cellulose acetate as parting agent. A pressure bag was inserted in the cup and the bag pressurised to 60 p.s.i. at room temperature. The pressurised assembly was then heated to 150° C for 2½ hours, allowed to cool to room temperature and the bag parting agent disassembled.

The end-cap was removed and the formed "Hypalon" cup slid gently from the steel tube. A tube, or casting pipe, moulded from "Formvar" polyvinyl formal powder was bonded to the domed end of the cup so that the bore of the tube was aligned with the central hole in the domed end. The bond was formed by coating the mating surfaces with a solution of "Formvar" in dioxane, and pressing them together while allowing them to air-dry for 24 hours.

The resin coated inner surface of the so-formed "Hypalon" inhibiting cup was degreased with methyl ethyl ketone and double-base propellant was cast into it by filling the cup with granular propellant powder based on nitro-cellulose and then displacing the air between the granules with a casting liquid comprising desensitised nitroglycerine. The casting liquid was forced into the cup through the casting pipe from a resevoir pressurised by nitrogen gas.

When the air had been displaced, the whole mass (nitrocellulose/nitroglycerine) was allowed to solidify and then cured at 60° C for 96 hours. The upper surface of the mass of propellant was maintained under a slight positive nitrogen pressure during the curing operation.

This method of preparation is ideally suited for small scale production of inhibited charges, e.g. for research and development projects.

EXAMPLE 2

A preformed inhibiting cup having a generally cylindrical body portion closed at one end by a domed cap, having a central hole and associated casting pipe, was moulded integrally from "Hypalon" moulding stock, i.e. chlorinated sulphonated polyethylene modified by the addition of inorganic fillers to improve its heat resistance and plasticisers to improve its flow properties.

The inner surface of the cup was buffed, degreased with trichlorethylene and stoved overnight at 60° C. The inner surface was then wiped with methylated spirit and air-dried for 15 minutes.

The inner surface of the cup was roll-coated with a solution of "Redux" 775 phenol-formaldehyde in methylated spirit (½ v/v) and air-dried for 2 hours. The process was then repeated to produce an even coating between 0.001 inch and 0.0015 inch thick and the cup air-dried for 30 minutes.

The tacky, coated surface was dusted with "Formvar" 1595E polyvinyl formal powder to give an even coverage, and the excess powder removed. The coated cup was stoved at 60° C overnight.

The inhibiting cup was fitted into a mould and the "Formvar" coated surface covered with a polypropylene foil parting agent. A pressure bag was inserted in the cup and pressurised to 60 p.s.i. The assembly was placed in a hot air oven and heated at 150° C for 2½ hours. The assembly was then allowed to cool and the pressure bag, parting agent and cured, coated inhibiting cup removed from the mould.

The coated surfaces were degreased with methyl ethyl ketone and a double-base propellant cast into the cup as described under Example 1.

Moulded inhibitors are most suitable when production runs involving large numbers are envisaged.

EXAMPLE 3

A cylindrical propellant charge of 3 inch diameter and having a cylindrical bore was mounted on a bar passing through its bore and the ends of the bore were sealed. The external propellant surface was wiped with methyl ethyl ketone, air-dried for 15 minutes, then coated with polyvinyl formal ("Formvar" 1595.S) lacquer by a dipping process. The lacquer solvent was removed by drying in a current of air at 60° C for 24 hours.

A mould having a cylindrical split mould part of diameter ¼ inch greater than that of the propellant was meanwhile made ready. The inner cylindrical surface of the mould part in its assembled condition was coated with silicone grease to prevent adhesion and an end closure of the mould was bolted in position at one end of the mould part and in sealing engagement with the mould part by means of an annular silicone rubber gasket which had an inner diamter substantially less than 3 inches. The end closure was fitted with an axial locating rod for engagement with the cylindrical bore to position the charge co-axially of the cylindrical mould part. The locating rod was threaded at its upper end so that the charge could be tightly forced against the radially inner regions of the silicone rubber gasket to prevent resin access to the bore.

Epoxide resin EL5 was mixed with hardener EHR1 in the weight proportion 100/80 and evacuated to remove air inclusions. The mixed resin was then drawn by vacuum into the base of an annular space defined between the charge and cylindrical mould part by means of a basal access pipe. When full, the basal access pipe was removed and the inlet hole sealed with a silicone rubber bung. The assembly was left to cure at room temperature for 16 hours, after which time the mould was disassembled and the inhibited charge released. Some charges were post-cured for a further 2 days at 60° C.

In this form, the method is most suitable for the inhibition of small charges required for research and development purposes, but by suitable adaption of the equipment and with the addition of a heating/cooling cycle to speed resin cure, the method could be used satisfactorily for the mass production of inhibited charges.

EXAMPLE 4

A preformed propellant charge was coated with polyvinyl formal, and dried, as in Example 3.

One side of a sheet of unvulcanised "Hypalon" inhibiting material, 0.020 inch thick, was first coated with a solution containing equal parts of "Redux" 775 liquid and "Formvar" 1595.S in ethylene dichloride/cyclohexanone (2/1) solvent by a calendering technique, so as to produce a dried film thickness of 0.001 inch. Both sides of the sheet were thus coated and dried for 15 minutes in a current of air at 60° C. A second lacquer coat consisting of "Formvar" 1595.S in ethylene dicloride/cyclohexanone solution was applied in like manner to both sides to produce an additional dried film thickness of 0.002 inch. The coated sheet was dried for 16 hours at 60° C, then rolled tightly on a mandrel with a polypropylene interleaving film to prevent contact of the prepared surfaces. A protective rubber sleeve was drawn over the roll and sealed at the ends.

Cure of the adhesives and "Hypalon" rubber in the composite assembly was carried out at a temperature of 150° C under a pressure of 90 p.s.i. After cooling and disassembly, the roll was arranged on a lathe and strips of prepared "Hypalon", 2 inches wide, parted off.

The preformed and coated propellant charge, from above, was helically butt-wrapped with these strips, bonding being effected by moistening the mating surfaces with acetone and allowing to dry under light pressure. Three layers of "Hypalon" tape were put on, the spiral junctions being out of phase, and bonding being effected as before by means of acetone.

A final cure of 2 days at 60° C was given to complete the bonding process.

Laboratory tensile tests, using disc-shaped butt joint assemblies, of steel/"Hypalon"/propellant/'-'Hypalon"/steel and steel/propellant/steel prepared in this way, have been found to fail cohesively in the propellant or "Hypalon" (whichever of these was the weaker) and only in the bond under tensile stresses in excess of 1200 p.s.i.

PROPERTIES OF INHIBITED CHARGES

Inhibited propellant charges produced by the processes described in the Examples showed marked improvements compared with similar charges inhibited with traditional cellulosic materials. For example:

1. Weight and Space Saving

Charges of 6 inches diameter having burning times of the order of 90 seconds, require only a 0.010 inch thickness of "Hypalon" inhibitor compared with a 0.14 inch to 0.20 inch thickness of cellulose acetate.

2. Increased Storage Life

Propellant charges containing more than 30% by weight of nitroglycerine and inhibited with cellulose acetate were stored at 140° F. After three months, the charges failed in an ignition test because of burn-through of the cellulose acetate, which was found to contain 40% by weight of nitroglycerine.

Similar charges inhibited with "Hypalon" in accordance with the invention functioned correctly on firing after nine months storage at 140° F. When these charges eventually failed, it was due to failure of the propellant, not the inhibitor, nor the inhibitor/propellant bond.

3. Improved Ability to Withstand Temperature Cycling

Solid propellant charges, 16 inches in diameter and 32 inches long, were divided into three groups and inhibited on one end and the entire cylindrical surface. The charges were inhibited with the following materials:

Group (a) cellulose acetate
Group (b) ethyl cellulose lacquered internally with nitro-cellulose
Group (c) "Hypalon".

The inhibited charges were then subjected to the following temperature cycling tests:

1. +5 × −5/105/70° F
   +5 × − 15/105/70° F
   +5 × − 15/125/70° F
   +5 × − 30/125/70° F
   +5 × −40/125/70° F
   +5 × −40/140/70° F
   +5 × − 40/140° F
2. −15/125/70° F

Group (a) charges showed propellant/inhibitor separations and inhibitor delaminations on the first cycle of the −30/125/70° F stage of test (1); and on the tenth cycle under test (2).

Group (b) charges showed extensive propellant/inhibitor separation during the first five −5/105/70° F cycles of test (1); and on the first cycle of test (2).

Group (c) charges completed the whole of test (1) and were later successfully fired at −40° F. They also successfully completed 25 cycles of test (2).

We claim:

1. A combustion-inhibited solid propellant charge comprising: a solid mass of double-base propellant comprising a mixture of nitrocellulose and a liquid nitric ester, the solid mass of double-base propellant having at least one surface at which combustion is to be inhibited; a layer of a polyvinyl acetal resin bonded directly to said surface; an elastomeric combustion-inhibiting material bonded to the layer of polyvinyl acetal resin; and a layer of another resin which is compatible with the polyvinyl acetal resin and with the elastomeric combustion-inhibiting material, said other layer being selected from the group of resins consisting of epoxy resins, polyesters and formaldehyde resins and being bonded between the layer of a polyvinyl acetal resin and the elastomeric combustion-inhibiting material.

2. A solid propellant charge according to claim 1 wherein the polyvinyl acetal resin is polyvinyl formal.

3. A solid propellant charge according to claim 1 wherein the elastomeric combusion-inhibiting material is selected from the group of elastomers consisting of a modified chlorinated sulphonated polyethylene, a modified ethylene-propylene terpolymer, a castable epoxide and a castable polyurethane rubber.

4. A solid propellant charge according to claim 3 wherein said another resin is phenol-formaldehyde resin and is bonded directly to the elastomeric combustion-inhibiting material.

5. A combustion inhibited solid propellant charge comprising a solid mass of double-base propellant comprising a mixture of nitro-cellulose and a liquid nitric ester, the solid mass of double-base propellant having at least one surface at which combustion is to be inhibited, a layer of polyvinyl formal bonded directly to said surface, an elastomeric combustion-inhibiting material selected from the group of elastomers consisting of a modified chlorinated sulphonated polyethylene, a modified ethylene-propylene terpolymer, a castable epoxide, and a castable polyurethane rubber bonded to the layer of polyvinyl formal, and a layer of phenol-formaldehyde bonded between the layer of polyvinyl formal and the elastomeric combustion-inhibiting material.

* * * * *